Dec. 17, 1963   R. C. DILLON ETAL   3,114,261
STRAIN WIRE FLOWMETER
Filed Sept. 3, 1959   3 Sheets-Sheet 1

INVENTOR
RICHARD C. DILLON
WILLIAM R. DUNBAR

BY

ATTORNEY

INVENTOR
RICHARD C. DILLON
WILLIAM R. DUNBAR
ATTORNEY

Dec. 17, 1963     R. C. DILLON ETAL     3,114,261
STRAIN WIRE FLOWMETER
Filed Sept. 3, 1959     3 Sheets-Sheet 3

INVENTOR
RICHARD C. DILLON
WILLIAM R. DUNBAR

BY
ATTORNEY

United States Patent Office 3,114,261
Patented Dec. 17, 1963

3,114,261
STRAIN WIRE FLOWMETER
Richard C. Dillon, 37784 Lorie Blvd., Avon, Ohio, and William R. Dunbar, 15700 Barbara Ave., Cleveland, Ohio
Filed Sept. 3, 1959, Ser. No. 838,003
2 Claims. (Cl. 73—228)
(Granted under Title 35, U.S. Code (1952), sec. 266)

The invention described herein may be manufactured and used by or for the Government of the United States of America for governmental purposes without the payment of any royalties thereon or therefor.

The present invention relates to a novel device for measuring the flow of fluids. More particularly, the invention concerns a strain-wire flowmeter which acts as a sensing element for the measurement of steady volume flow rates and dynamically-varying flows.

Previous methods for measuring dynamically-varying flows utilized either hot wire anemometers adapted to liquids, or commercial differential pressure transducers as part of an inferential head measuring system. The commercial transducers work on either the unbonded strain gage or variable reluctance principle coupled with a diaphragm or Bourdon tube pressure sensing elements. The inferential head system usually consisted of a total head Pitot tube in the flowing stream and a piped wall static head tube. The steady flow rate or flow level was obtained by separate conventional flow instrumentation such as an orifice meter. Neither of these two methods is satisfactory. The hot wire anemometer is a delicate, complex instrument requiring much in the way of supplementary equipment. The inferential head measuring systems utilizing differential pressure transducers would not function at full frequencies greater than about 100 cycles per second because of the liquid dynamics of the leader tubes and transducer passages.

An object of this invention is the suspension of a strain-wire flowmeter consisting of a two or four-arm Wheatstone bridge wherein each arm is a strain wire in a flowing stream whereby the viscous drag on the strain wire suspended increases or decreases the strain in the wire and therefore the electrical resistance of the wire as a function of the stream velocity.

Another object of the invention is the measurement of steady volume flow rates and dynamically varying flows over a frequency range of 0 cycles per second to an upper limit of 2500 cycles per second.

A further object of the invention is the location of a wire sensing element at the point of measurement in the stream.

Still another object of the invention is a flowmeter device which presents virtually no restriction in the line.

A still further object of the invention is a flowmeter device which is not restricted by line size.

Other objects and many dependent advantages of the present invention will be apparent from the following detailed description when taken together with the accompanying drawings in which.

Figure 1:
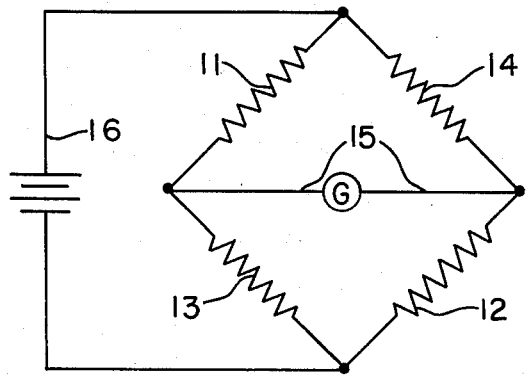
FIG. 1 is a diagram of a conventional four-arm Wheatstone bridge.

Referring now to the drawings, wherein like reference characters desingate like or corresponding parts throughout the several views, there is shown in FIG. 1 a conventional four-arm Wheatstone bridge. In the normal operation of the device, all arms are suspended in the liquid. The two active and opposite arms 11 and 12 are suspended such that they are acted upon by the flow stream force, while the other two opposite arms normally designated 13 and 14 are sheltered from the flow force and act as temperature compensating arms since temperature changes affect all arms equally and do not further unbalance the bridge. The excitation voltage 16 is supplied by any conventional means and a conventional metering device is fastened to the output leads 15.

Figure 2:
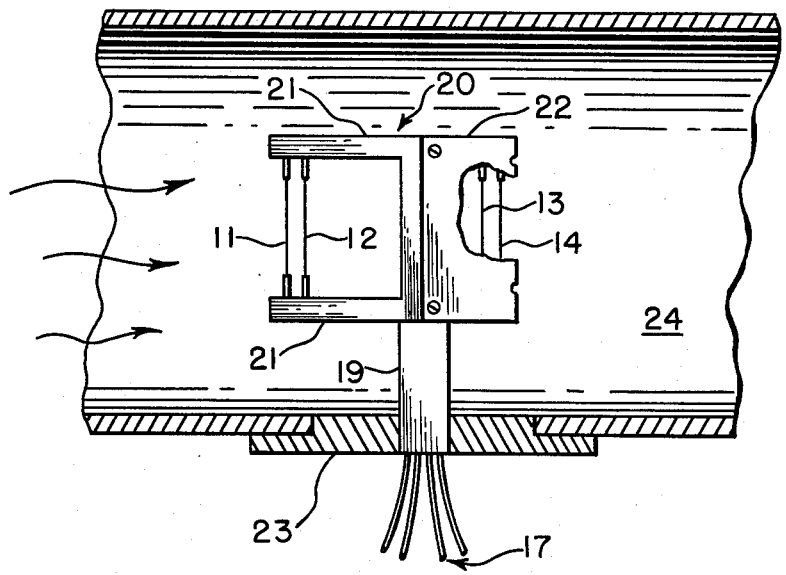
FIG. 2 is a cross-sectional view of one preferred embodiment of a strain-wire flowmeter inserted in a line.

Referring now to FIG. 2, wherein a conventional tube 24 is shown containing the flowmeter 20 which has two support means 21 for the active arms 11 and 12, while a protective cover 22 protects the two temperature compensating arms 13 and 14 so as to shield them from the current effect of the stream and a support 19 for the leads 17 to the four-arm bridge is attached to a plate 23 which is secured to the wall of the pipe 24 by any conventional means.

Figure 3:
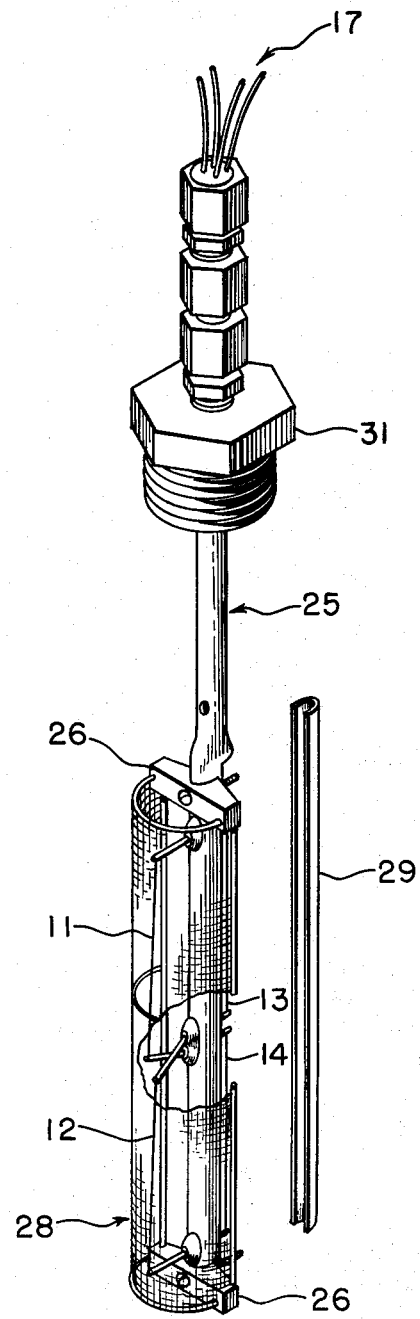
FIG. 3 represents a second preferred embodiment of a strain-wire flowmeter specifically adaptable to streams containing impurities and other solid material.

Referring now to FIG. 3, a protective screen 28 which permits the passage of a liquid stream covers the active arms 11 and 12 while a shield 29 covers the temperature compensating arms 13 and 14, both the screen 28 and shield 29 being secured to two base plates 26 which are fastened by conventional means to a protective tube housing 25 which contains the lead wires 17. The flowmeter may be inserted in an opening and secured by a means such as shown by reference numeral 31. The protective screening 28 is especially preferable when dealing with fluids containing impurities and solid materials that would likely injure the fine wires which constitute the active arms 11 and 12.

Figure 4:
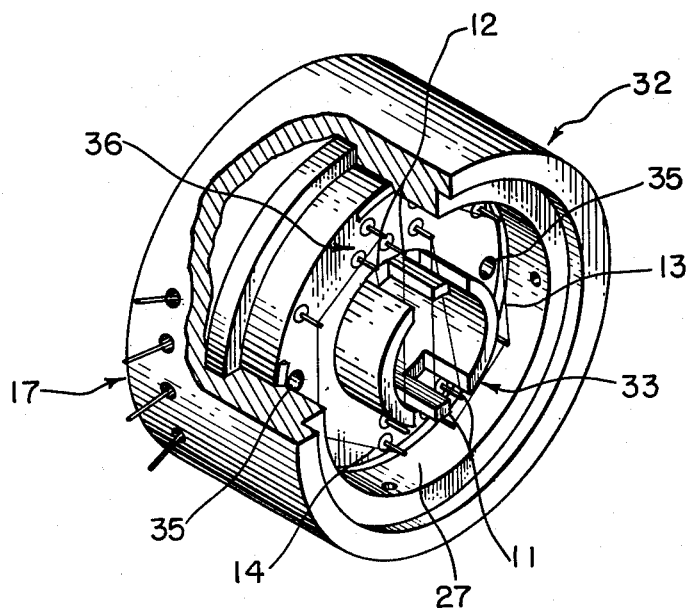
FIG. 4 represents a third preferred embodiment of a strain-wire flowmeter disclosing the side which normally faces downstream of the fluid flow.
Figure 5:
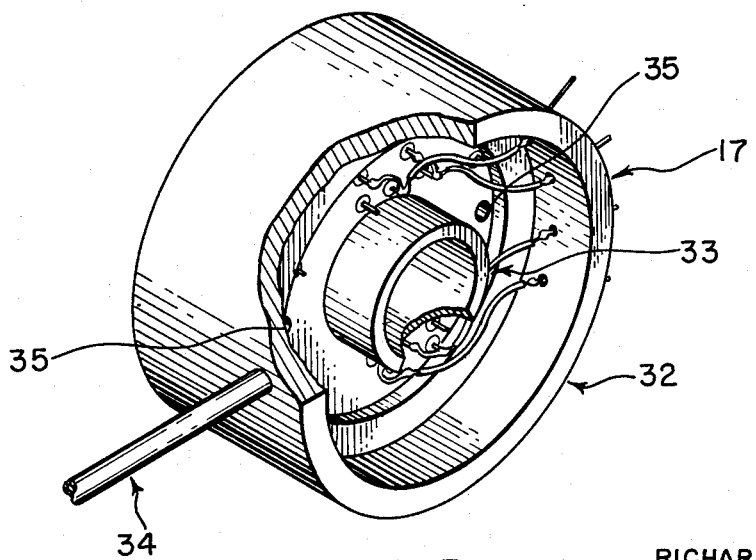
FIG. 5 is the flowmeter in FIG. 4 disclosing the side which normally faces upstream of the fluid flow.

Referring now to FIGS. 4 and 5, a cylindrical housing 32 has a concentric passageway 33 through which the fluid passes while the active arms 11 and 12 are stretched across said passageway 33 and fastened to supports 27. The temperature compensating arms 13 and 14 are attached to support means 27 located on the inner portion 36 of the cylindrical shell 32 while openings 35 are provided in said base 36 whereby fluid may pass so that the compensating arms will be maintained at the same temperature as the active arms located in the concentric opening 33. The four leads 17 protrude from the shell 32 while an arm 34 is fastened to the said shell 32 so as to facilitate in the placing of the flowmeter in the fluid stream to be measured.

Since the active arms 11 and 12 are on opposite sides of the bridge an increase in flow or increase of resistance of the active arms 11 and 12 will further unbalance the bridge. Because the compensating arms 13 and 14 are located adjacent to the active arms 11 and 12 and as a fluid temperature change affects all arms equally, the temperature effect is balanced out. Of course, all arms should be of equal material and length and mounted on the same base material. The resistance unbalance of the bridge due to stream velocity is measured by supplemental equipment (not shown) consisting of a commercial high frequency carrier amplifier and sensitive galvanometer system, which is normally employed in the art. In the case of a two-arm bridge, the operation and equipment are the same except that two fixed resistors are used to complete the bridge circuit.

The principle of the strain gage is that the changing of the tension in a length of wire will change its electrical resistance. This is because an increase in tension will increase the wire length and to a lesser extent decrease the diameter. Since the resistance varies directly with length and inversely with cross-sectional area, both effects result in an increase in resistance. The result is a change in resistance proportional to a change in strain within the elastic range of the wire material. There is also a change in resistance due to a change in the properties of the wire itself but this is usually small in comparison to the change in strain. Strain change is measured as a resistance change in the actual strain gage device. Strain is then calibrated to such parameters as weight, position, torque, acceleration, stress, or flow as in this case stream velocity past the strain wire.

It is to be noted that quite often the active wire length required for a given velocity range does not provide high enough bridge resistance (bridge resistance being equal to the resistance of one arm). Hence, more than one length of wire per arm is required or fixed resistors are required. However, the latter offers less sensitivity. The device shown in FIGS. 4 and 5 illustrates the situation where two lengths of wire are used for the active arm. It is desirable to put some initial tension in the wire where the meter will be used over a wide range of flows. This initial tension will remove the initial bends in the wire, increase meter rangeability, and take care of any differences in thermal expansion between the wire and its mounting structure due to large temperature changes.

Obviously, many modifications and variations of the present invention are possible in the light of the above teachings. It is, therefore, to be understood that within the scope of the appended claims the invention may be practiced other than as specifically described.

What is claimed is:

1. Apparatus for measuring the flow of fluids through a tubular housing comprising, a mounting member secured to the exterior of said housing, an elongated tubular member extending through said mounting member into said housing, a plurality of outwardly projecting supports carried by said elongated tubular member within said housing, a first pair of strain-wire resistance elements connected between selected supports, said first pair of strain-wire resistance elements being exposed to said flowing fluid, a second pair of strain-wire resistance elements connected between the remaining supports, a cover member carried by said elongated tubular member for enclosing said second pair of strain-wire resistance elements, and a plurality of leads extending through said elongated tubular member for connecting said first and second pairs of strain-wire resistance elements to a metering means.

2. Apparatus for measuring the flow of fluids through a tubular housing as claimed in claim 1, including a protective screen mounted adjacent said first pair of strain-wire resistance elements.

References Cited in the file of this patent

UNITED STATES PATENTS

| | | |
|---|---|---|
| 2,032,383 | Vroom | Mar. 3, 1936 |
| 2,647,403 | Fenske | Aug. 4, 1953 |
| 2,760,038 | Statham | Aug. 21, 1956 |
| 2,943,486 | Osgood | July 5, 1960 |
| 2,989,866 | Widell et al. | June 27, 1961 |

FOREIGN PATENTS

| | | |
|---|---|---|
| 631,973 | Great Britain | Nov. 14, 1949 |